(12) United States Patent
Ganter

(10) Patent No.: US 6,234,735 B1
(45) Date of Patent: May 22, 2001

(54) SPRING-LOADED COMPRESSION AND TENSION PIN

(75) Inventor: Bernhard Ganter, Furtwangen (DE)

(73) Assignee: Otto Ganter GmbH & Co. KG, Furtwangen (DE)

( * ) Notice: Subject to any disclaimer, the term of this patent is extended or adjusted under 35 U.S.C. 154(b) by 0 days.

(21) Appl. No.: 09/488,458

(22) Filed: Jan. 20, 2000

(30) Foreign Application Priority Data

Sep. 19, 1999 (DE) ........................... 299 15 697 U

(51) Int. Cl.[7] ................ F16B 21/18; F16B 35/02
(52) U.S. Cl. .............. 411/384; 411/353; 411/393
(58) Field of Search ........................... 411/383, 384, 411/178, 352, 353, 392, 393

(56) References Cited

U.S. PATENT DOCUMENTS 2,221,101 * 11/1940 Lefkowitz ................... 411/393 X
4,796,581 * 1/1989 Bruhmann .................. 411/393 X
4,930,371 * 6/1990 Schneider .................. 411/393 X
5,586,852 * 12/1996 Ganter ........................... 411/353

FOREIGN PATENT DOCUMENTS 89 11 835   5/1990 (DE).
2201720    9/1988 (GB).

* cited by examiner

Primary Examiner—Neill Wilson
(74) Attorney, Agent, or Firm—Baker & Daniels

(57) ABSTRACT

The present invention deals with a spring-loaded tension and compression pin comprising a bush containing a spring and plunger for locating mechanical components, in which the plunger has at least one guide surface and/or at least one edge on its generated surface which engages directly with a corresponding guide surface on the threaded bush.

18 Claims, 6 Drawing Sheets

FIG_4
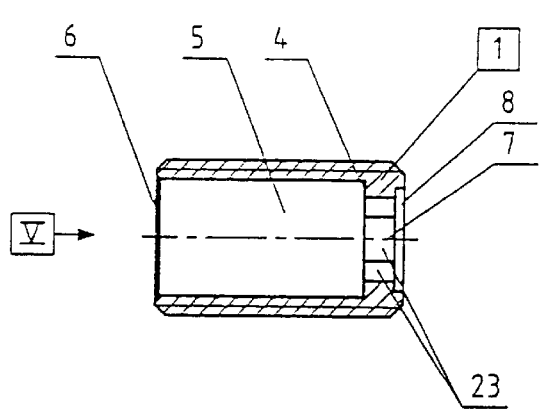
FIG_5
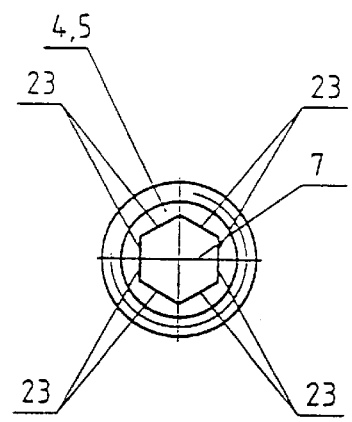

FIG_16
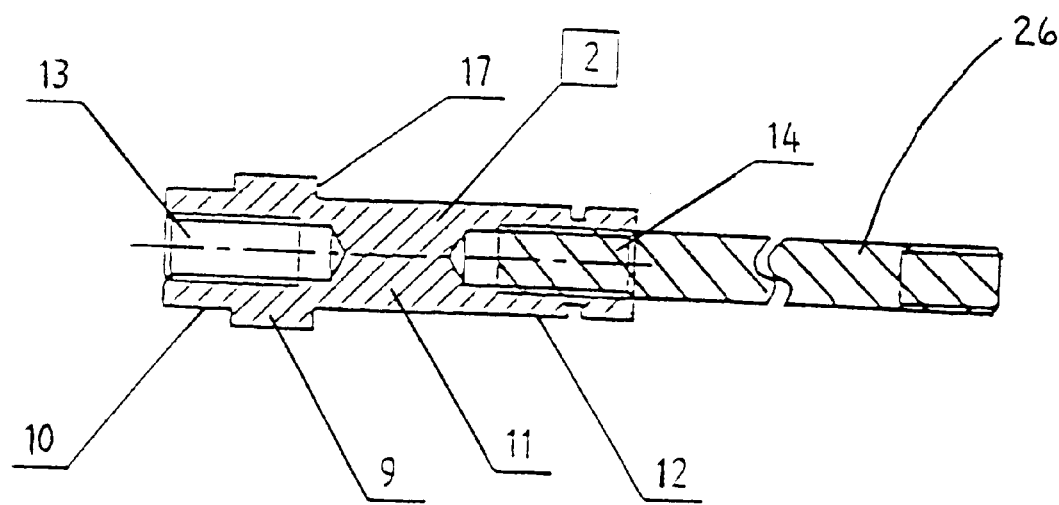
FIG_17
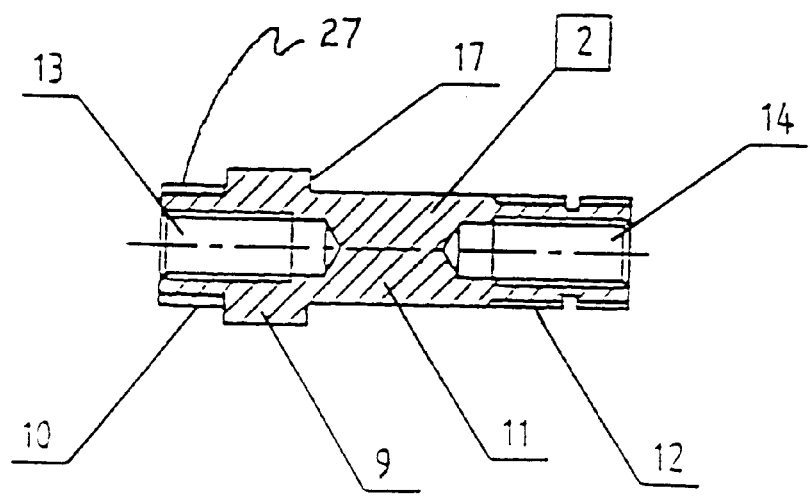

SPRING-LOADED COMPRESSION AND TENSION PIN

BACKGROUND

1. Field of the Invention

The invention relates to a spring-loaded compression or tension pin according to the introductory part of Claim 1. Such spring-loaded compression and tension pins are known in their embodiment as machine elements where there is a need to locate or hold elements with a spring-loaded compression pin which engages in a suitably adapted mating surface.

2. Description of the Related Art

By releasing the spring-loaded compression pin from a surface to which it has been assigned, the connection between the compression pin and that surface can be unmade. Such a component has a variety of uses as a machine part, and essentially comprises an outer bush which has an external screw thread and an internal bore.

A spring-loaded plunger is inserted in this bore, with one end resting on the spring. The spring rests on a bearing surface inside the bush. This bearing surface is fixed with respect to the housing.

Thus the plunger is axially displaceable under spring loading inside the internal bore of the externally threaded bush.

By exerting a pulling force on the plunger, the force of the spring can be overcome and the plunger displaced inside the bush, thus unlocking the plunger from the opposing machine surface.

Such spring-loaded elements have proved effective. However, they have the drawback that the mounting of the plunger in the receiving bore in the threaded bush does not restrain the plunger in the torsional direction. This has hitherto been unnecessary, as the front end of such plungers is usually given a round (or similarly rotationally symmetrical) profile, so that torsional restraint is not important.

But there are various applications in which torsional restraint is important, for example where the plunger is to be positioned on a projecting edge. The plunger then has to be given suitably profiled faces which will clasp the edges. This presupposes that the plunger is torsionally restrained, otherwise there can be no certainty that the profiled edge on the plunger will be aligned with the opposing edge, which is itself fixed with respect to the machine.

Therefore the basic problem of the invention is to develop a spring-loaded compression or tension pin of the kind stated at the outset so that the plunger is held in the threaded bush in a torsionally restrained manner.

SUMMARY OF THE INVENTION

This problem is solved by the technical teaching of Claim 1. The invention is characterized in that the spring-loaded plunger has suitable guide surfaces which work in conjunction with corresponding guide surfaces on the threaded bush to allow axial displacement only, and to prevent torsional displacement.

The given technical teaching yields the considerable advantage that, in accordance with the invention, guide surfaces are provided in the interior of the bush and on the outer periphery of the plunger which guide the plunger in a form-fitting manner and allow displacement in the axial direction only, and prevent torsional displacement.

It thus becomes possible, for the first time, for such threaded bushes also to be used in conjunction with prismatic plungers, that is to say, plungers with e.g. a prism or other guide surface or profiled surface at their front end.

This yields the advantage that such plungers can be used for locating suitably profiled parts, inasmuch as a plunger provided with a guide surface of the kind described will co-operate with, hold on to, and locate, the profiled surface, fixed with respect to the machine, to which it is assigned.

The arrangement of guide surfaces in the interior between the threaded bush and the mating surfaces of the plunger offers several (12) alternatives.

In the simplest form, a slot guide can be adopted, that is to say, the threaded bush has a recess in the form of a slot in a specific position along its axial length, and the plunger engages by a corresponding profiled slot-face into that recess, thus providing torsional restraint.

Another kind of guide surface is the hexagonal guide surface, that is to say, a hexagonal guide recess is provided in a specific position within the axial length of the threaded bush and the plunger engages into that recess in the specified position by an external profile that is likewise hexagonal, so that the two mating hexagonal guide surfaces secure the plunger against torsional movement but permit axial displacement within this range.

Instead of the hexagonal guide, any other profiled guide surfaces can be used, such as, for example, all polygonal forms, or even semicircular or elliptical toothing, or serrations. Basically, any form of torsional lock can be used that has at least one edge and/or at least one face which prevents torsional movement of the tension and compression pin.

Moreover it makes no difference, so far as the solution of the stated problem is concerned, where within the axial length of the threaded bush these guide surfaces are placed.

They can be located in the interior of the threaded bush. Alternatively, they can be located in the region of the openings at the opposite ends of the threaded bush.

Moreover it is sufficient to provide such a guide surface in the region of only one of the openings of the threaded bush, and to dispense with torsional restraint at the other end opening.

In another embodiment, however, torsional restraint can be provided at both ends of the threaded bush.

Thus the positioning of the guide surface on the threaded bush along its longitudinal axis is such that the guide surface on the plunger adjoins at least a part of the guide surface on the threaded bush when the plunger is in both the operated and the non-operated condition.

This means that the internal bore of the threaded bush does not have to be circular: it can also be formed along its entire length as a guide surface matching the outer periphery of the plunger, so that the plunger is torsionally restrained but axially displaceable inside this internal recess in the bush.

One major advantage of the arrangement according to the invention is that the torsional restraint between the plunger and the outer bush with its external screw thread affords better possibilities for screwing such a bush into a corresponding tapped hole in a machine part.

Specifically, screwing flats can now be provided on the plunger, which generally projects from the threaded bush; and screwing flats can even be omitted from the threaded bush itself—where the forming of suitable turning flats has sometimes caused considerable difficulties. Another drawback of such turning flats or driving faces on the threaded bush is that they restrict the diameter of the internal bore of the bush, and hence the diameter of the plunger.

There is now substantially greater freedom of design, as suitable turning flats can now be provided on the plunger itself.

A further advantage is that these turning flats can now be arranged at both ends of the plunger, provided the plunger projects from the threaded bush at both ends. It is envisaged that the plunger will project from at least one end of the threaded bush.

Here the term "turning flat" should be given a broad interpretation: it also covers driving faces i.e. a simple slot allowing the plunger to be turned by means of a screwdriver, the bush then turning along with the plunger owing to the torsional restraint which the invention provides.

This yields the advantage that such threaded bushes can now also be screwed into blind holes. That was previously impossible because, if a threaded bush of known type were screwed into a blind hole, the turning flats would be at the end of the bush that was at the bottom of the hole, and so would be inaccessible.

In a development of the present invention, the spring-loaded plunger is an all-purpose component, and the plunger is therefore preferably formed as a bush-type part with at least one axial tapped socket.

If the tapped socket is located at the front end, it is capable of receiving various screw-in tips. As well as round plunger-tips, prismatic plunger-tips can be used.

According to a development of the invention, in addition to the tapped socket at the front end, a second tapped socket, in axial alignment with the first, is provided at the opposite (rear) end of the plunger. This tapped socket is likewise capable of receiving various screw-in control elements, such as for example a threaded rod 26 (FIG. 16) enabling the plunger to be remotely operated from a distance of e.g. 1 m.

Control knobs and control elements in general for operating the plunger can also be screwed into this end of the threaded bush.

If the plunger has axial sockets, aligned with each other, at opposite ends, there is the further advantage that the threaded bush essentially becomes an all-purpose component, as it does not have to be used only as a compression element but can also serve as a tension element.

Say, instead of a control element, an actuating component for applying tension the plunger is screwed into the rear socket in the plunger. For example, a clevis can engage in this part of the plunger. When the plunger is released from the opposite end, this clevis moves, performing e.g. a positioning action.

From this it follows that a plunger which has axial sockets at opposite ends is an all-purpose component capable of being used as a tension and/or compression element depending on the operating elements which are screwed into the two opposing sockets.

The expression "opposing axial sockets" should be given a broad interpretation.

Instead of the internally screwed sockets which have been described here, other "sockets" may be used: for example, the plunger may have a corresponding external screw 27 (FIG. 17) thread at its two opposite ends and, depending on the requirements, tips, operating elements or tension devises can then be screwed on to this external screw thread.

Thus the invention provides that, at least in the region of its ends, the plunger has an external screw thread on at least one of its ends.

The subject-matter of the present invention is disclosed not only by the subject-matter of the individual claims, but also by the claims taken in combination.

All details and features disclosed in the documents, including the abstract, and in particular the embodiment illustrated in the drawings, are claimed as essential to the invention in so far as, individually or in combination, they are novel with respect to the state of the art.

BRIEF DESCRIPTION OF THE DRAWINGS

The invention will now be described in detail with reference to drawings illustrating a number of ways of carrying out the invention. Further essential features and advantages of the invention will become apparent from the drawings and from the description thereof.

FIG. 4: Section through threaded bush FIG. 5: End view of threaded bush in the direction of Arrow V of FIG. 4

FIG. 16: Section through the spring-loaded plunger according to FIG. 6, illustrating a link to a remote control engaged with the plunger.

FIG. 17: Section through the spring-loaded plunger according to FIG. 6, illustrating an external screw thread provided on the plunger.

DETAILED DESCRIPTION OF THE INVENTION

Figure 1:
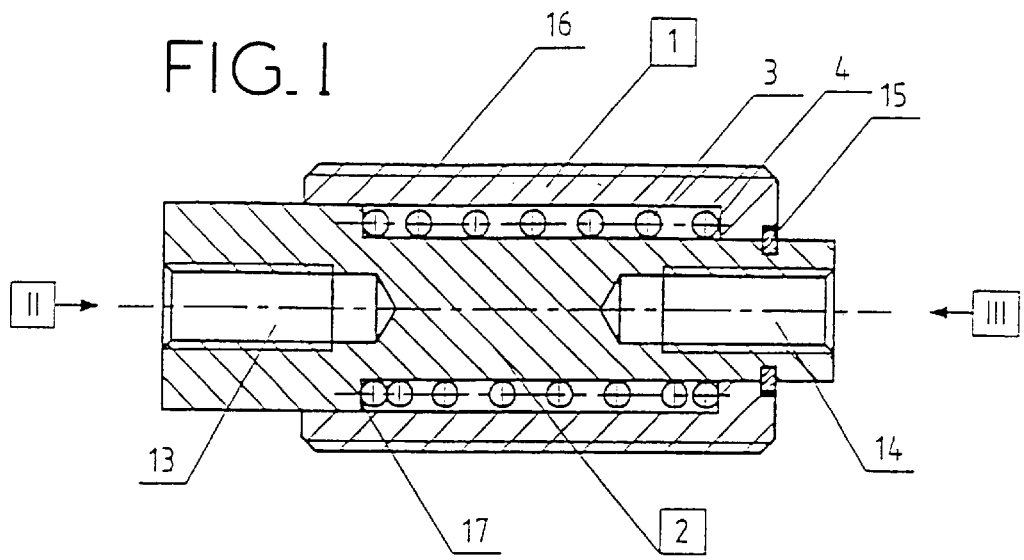
FIG. 1: Section through a spring-loaded element according to the invention
Figure 2:
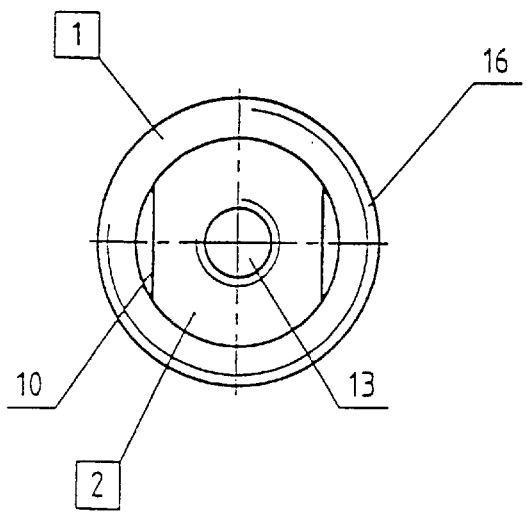
FIG. 2: End view of the spring-loaded element in the direction of Arrow II of FIG. 1
Figure 3:
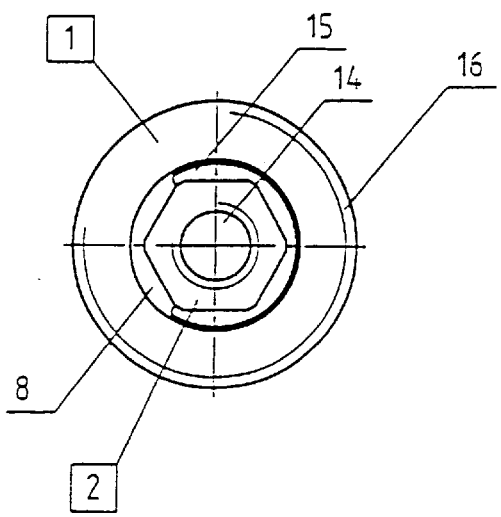
FIG. 3: End view of the spring-loaded element of FIG. 1 in the direction of Arrow III

FIG. 1 shows the general arrangement of a threaded bush 1 with an external screw thread 16. This threaded bush 1 is adapted for screwing into a corresponding hole in a machine part.

A plunger 2 is guided within the threaded bush 1 in an axially displaceable manner and is acted on by a compression spring 3.

The important feature is that the plunger 2 is torsionally restrained in the bore 5 of the threaded bush 1.

One end of the compression spring 3 bears on a shoulder 17 of the plunger 2 (see FIG. 6), while the opposite end bears on a shoulder 4 in the region of the bore 5 of the threaded bush 1.

Here the important feature is that the plunger 2 has two opposing axial tapped sockets 13, 14 into which various fittings can be screwed.

Figure 14:
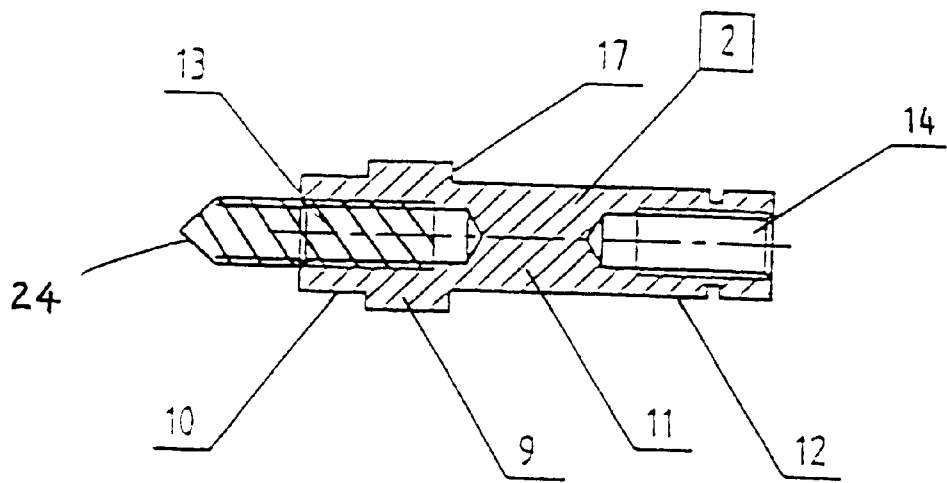
FIG. 14: Section through the spring-loaded plunger according to FIG. 6, illustrating a plunger tip engaged with the plunger.

A tip 24 (FIG. 14), which has e.g. a spherical profile, a prismatic profile, a conical profile, or the like, at its leading end, can be screwed into the tapped socket 13.

Figure 15:
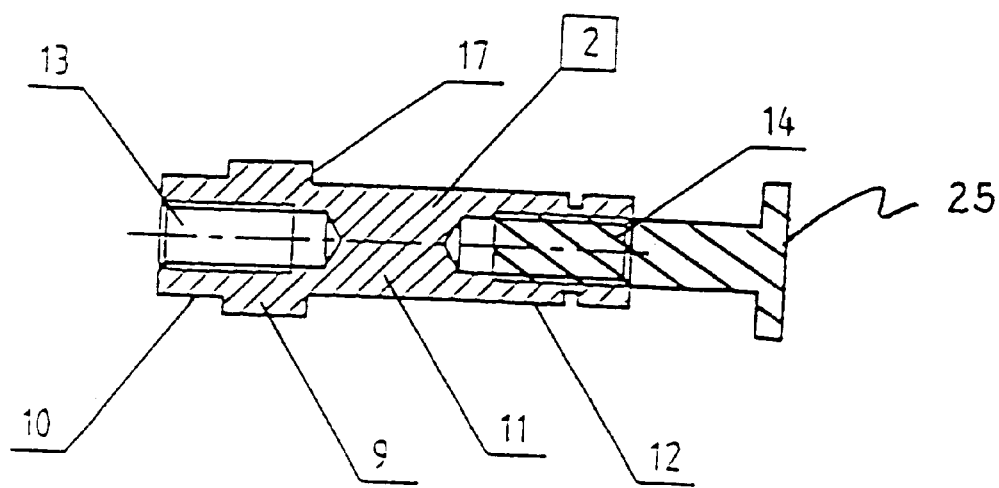
FIG. 15: Section through the spring-loaded plunger according to FIG. 6, illustrating a control element engaged with the plunger.

A corresponding operating element 25 (FIG. 15) can be screwed into the rear tapped socket 14. Alternatively, however, a tip can be screwed into the rear socket 14, in which case it functions in precisely the opposite way to the tip screwed into the opposite socket 13.

For example, the opposite surface—fixed with respect to the machine—is engaged by the tip inserted in the socket 14 only if this engagement is sustained by corresponding pressure on the plunger against the action of the compression spring. Immediately the pressure on the plunger is removed, this tip disengages from the surface, fixed with respect to the machine, to which it has been assigned.

Accordingly, the spring-loaded element described here is for use as either a compression or a tension element.

Formed in the bore of the threaded bush 1 are two opposing openings 6, 7. The opening 6 has a round profile, whereas the opening 7 forms the torsional restraint for the axially displaceable plunger.

This torsional restraint according to FIGS. 4 and 5 consists of a hexagonal opening which has suitably profiled faces. The plunger 2 according to FIGS. 6 and 7 has mating guide surfaces 12 and these engage in this hexagonal opening 7.

Figures 6, 7, 8:
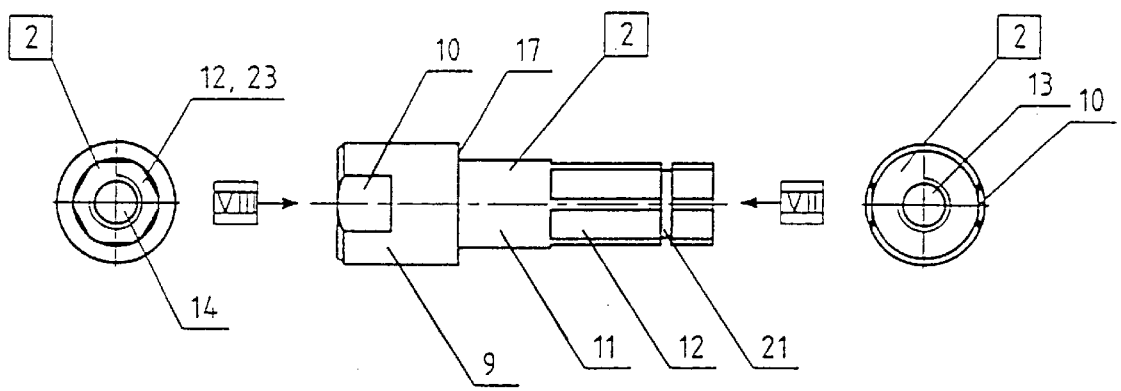
FIG. 6: Side view of a spring-loaded plunger according to FIG. 1
FIG. 7: End view of the spring-loaded plunger in the direction of Arrow VII
FIG. 8: End view of the spring-loaded plunger in the direction of Arrow VIII in FIG. 6
Figure 9:
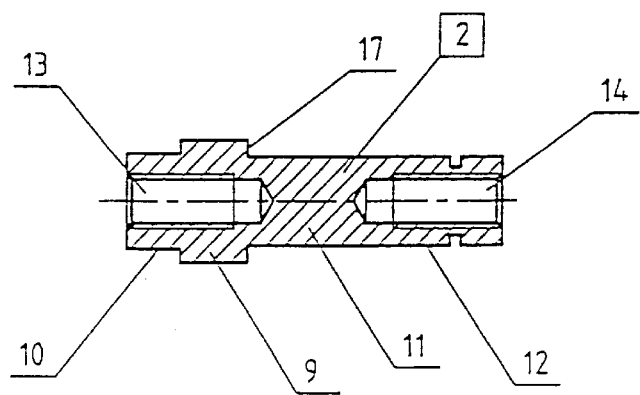
FIG. 9: Section through the spring-loaded plunger according to FIG. 6
Figures 10, 11, 12:
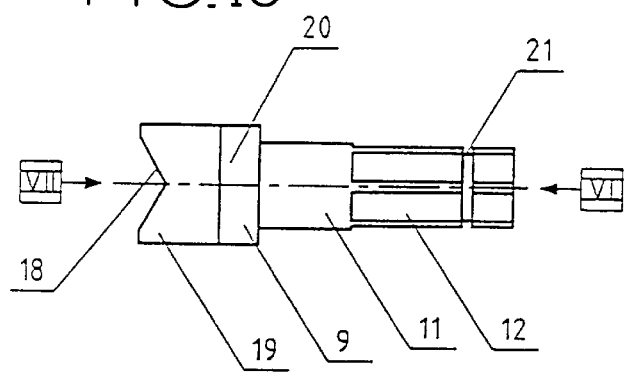
FIG. 10: Side view of another spring-loaded plunger with a different configuration
FIG. 11: End view of the spring-loaded plunger according to FIG. 10 in the direction of Arrow XI
FIG. 12: End view of the spring-loaded plunger in the direction of Arrow XI

The axial length of the hexagonal guide surfaces 12 according to FIGS. 6 and 7 is determined so that torsional restraint is maintained over the entire stroke of the plunger 2 in the threaded bush 1.

It has already been mentioned in the general part of the description that the invention is not limited to the arrangement of the profiled opening 7 in conjunction with the guide surface 12.

In another configuration, a similar profile may be provided in the region of the opening 6, to co-operate with a corresponding profile on the plunger 2.

Again, the bore 5 may be formed as a profiled surface over its entire length.

In the illustrated embodiment, the plunger has a round portion 9 at the end engaging in the opening 6. The end part of the round portion 9 is provided with spanner flats 10.

Other driving faces can of course be formed instead of such spanner flats 10, such as e.g. a slot opening, a square head, or any polygonal surfaces that can be acted on by a corresponding tool.

From the round portion 9 there is a transition to a plunger shank 11 of smaller diameter which carries the polygonal profiled guide surfaces 12 at the front end.

The rear end face of the threaded bush 1 is provided with a counterbore 8 in which a Seeger cirlip ring 15, which serves as the axial retainer of the plunger 2, engages.

As can be seen from FIG. 1, this circlip ring 15 lodges in the counterbore 8 with aesthetically pleasing effect. This, of course, is not necessary from a practical point of view. The counterbore 8 can be dispensed with, in which case the circlip ring 15 will lie on the front end face of the threaded bush 1.

Other retaining means can of course be employed instead of a Seeger circlip ring, such as e.g. a split pin or a nut.

As FIGS. 10 to 13 show, the plunger 2 may be replaced with a plunger 20 which, instead of a front-end tapped socket 13, has an prismatic head 19 which can be profiled to match a corresponding canted surface.

In this embodiment the plunger 20 and its tip are made in one piece, whereas the embodiment according to FIG. 1 has shown that an assembly of separate parts is also feasible.

Figure 13:
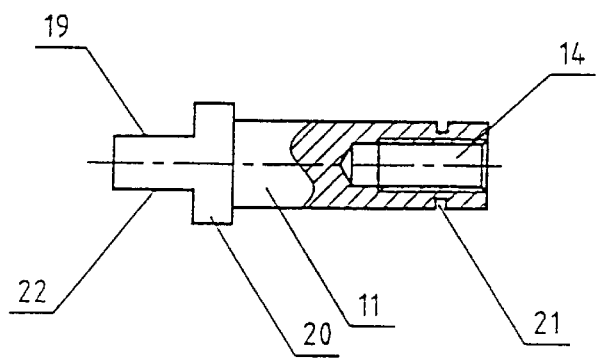
FIG. 13: Partial section through the spring-loaded plunger according to FIG. 10

In the embodiment shown in FIGS. 10 to 13, the front-end prism 18 of the head 19 is also formed with spanner flats 22, as can be seen from FIG. 13.

Here again the round portion 9 of large diameter connects to the plunger shank 11 of smaller diameter, which merges into the polygonal profiled guide surface 12.

The groove 21 to serve as the seat for the Seeger circlip ring 15 is located in the region of this guide surface 12.

What is claimed is:

1. Spring-loaded tension and compression pin comprising a bush containing a spring and plunger for locating mechanical components, characterized in that the plunger (2) has at least one guide surface (12) or at least one edge on its generated surface engaged with a corresponding guide surface (23) on the threaded bush (1), the guide surface on the threaded bush being positioned along a longitudinal axis of the threaded bush, wherein the guide surface on the plunger is adjoined with at least a part of the guide surface on the threaded bush when the plunger is in both the operated and the non-operated condition.

2. Spring-loaded tension and compression pin according to claim 1, characterized in that the positioning of the guide surface (23) on the threaded bush (1) along its longitudinal axis is such that the guide surface (12) on the plunger (2) adjoins at least a part of the guide surface (23) on the [threaded bush ] when the plunger is in both the operated and the non-operated condition.

3. Spring-loaded tension and compression pin according to claim 1, characterized in that the bush (1) has an external screw thread (16).

4. Spring-loaded tension and compression pin according to claim 1, characterized in that a portion of the plunger (2) includes a socket therein.

5. Spring-loaded tension and compression pin according to claim 1, characterized in that the plunger (2) projects from at least one end of the threaded bush (1).

6. Spring-loaded tension and compression pin comprising a threaded bush containing a spring and a plunger for locating mechanical components, characterized in that the plunger (2) has at least one guide surface (12) or at least one edge on its generated surface engaged directly with a corresponding guide surface (23) on the threaded bush (1), the plunger (2) has at least one axial tapped socket (13).

7. Spring-loaded tension and compression pin according to claim 6, characterized in that a plunger tip is screwed into the axial tapped socket (13) in the plunger (2).

8. Spring-loaded tension and compression pin according to claim 6, characterized in that the plunger (2) has an additional axial tapped socket (14).

9. Spring-loaded tension and compression pin according to claim 6, characterized in that a control element is screwed into the axial tapped socket in the plunger (2).

10. Spring-loaded tension and compression pin according to claim 6, characterized in that a link to a remote control is screwed into the axial tapped socket in the plunger (2).

11. Spring-loaded tension and compression pin comprising a threaded bush containing a spring and a plunger for locating mechanical components, characterized in that the plunger (2) has at least one guide surface (12) or at least one edge on its generated surface engaged directly with a corresponding guide surface (23) on the threaded bush (1), the plunger (2) has an external screw thread positioned within a region located at one end of the plunger.

12. Spring-loaded tension and compression pin comprising a threaded bush containing a spring and a plunger for locating mechanical components, characterized in that the plunger (2) has at least one guide surface (12) or at least one edge on its generated surface engaged directly with a corresponding guide surface (23) on the threaded bush (1), a Seeger circlip ring (15) is mounted on the plunger (2).

13. Spring-loaded tension and compression pin according to claim 12, characterized in that the Seeger circlip ring (15) rests on the threaded bush (1).

14. Spring-loaded tension and compression pin comprising a threaded bush containing a spring and a plunger for locating mechanical components, characterized in that the plunger (2) has at least one guide surface (12) or at least one edge on its generated surface engaged directly with a corresponding guide surface (23) on the threaded bush (1), the threaded bush includes a counterbore (8) provided in a rear end face of the threaded bush (1).

15. Spring-loaded tension and compression pin according to claim 14, characterized in that a Seeger circlip ring (15) rests in the counterbore (8) in the threaded bush (1).

16. Spring-loaded tension and compression pin comprising a threaded bush containing a spring and a plunger for locating mechanical components, characterized in that the plunger (2) has at least one guide surface (12) or at least one edge on its generated surface engaged directly with a corresponding guide surface (23) on the threaded bush (1), the guide surface (23) of the threaded bush (1) has a polygonal configuration.

17. Spring-loaded tension and compression pin according to claim 16, characterized in that the guide surface (23) of the threaded bush (1) has a hexagonal configuration.

18. Spring-loaded tension and compression pin according to claim 16, characterized in that the guide surface (23) of the threaded bush (1) has a star-shaped configuration.

* * * * *

UNITED STATES PATENT AND TRADEMARK OFFICE
CERTIFICATE OF CORRECTION

PATENT NO. : 6,234,735 B1 Page 1 of 1
DATED : May 22, 2001
INVENTOR(S) : Bernhard Ganter It is certified that error appears in the above-identified patent and that said Letters Patent is hereby corrected as shown below:

Title page,
In the Foreign Application Priority Data, change the date of German Application No. 299 15 697 from "Sep. 19, 1999" to -- Sep. 7, 1999 --

Signed and Sealed this

Eleventh Day of December, 2001

*Attest:*

NICHOLAS P. GODICI
*Attesting Officer* *Acting Director of the United States Patent and Trademark Office*